(No Model.)
D. B. & H. W. RANDALL.
FRUIT GATHERER.
No. 442,639. Patented Dec. 16, 1890.
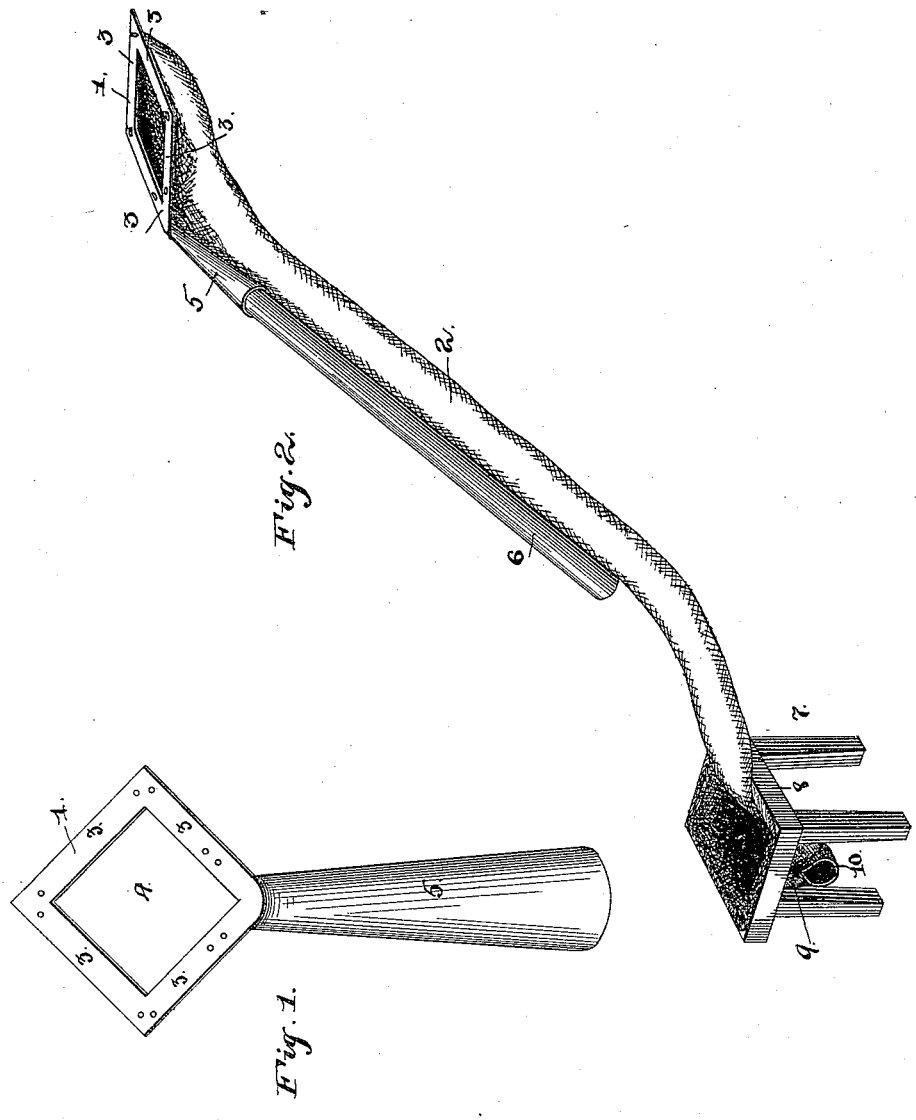

UNITED STATES PATENT OFFICE.

DANIEL B. RANDALL AND HENRY W. RANDALL, OF FLY CREEK, NEW YORK.

FRUIT-GATHERER.

SPECIFICATION forming part of Letters Patent No. 442,639, dated December 16, 1890.

Application filed June 21, 1890. Serial No. 356,285. (No model.)

*To all whom it may concern:*

Be it known that we, DANIEL B. RANDALL and HENRY W. RANDALL, citizens of the United States, residing at Fly Creek, in the county of Otsego and State of New York, have invented a new and useful Fruit-Gatherer, of which the following is a specification.

The invention relates to improvements in fruit-gatherers.

The object of the present invention is to provide a simple and inexpense fruit-gatherer adapted to be readily and conveniently handled and capable of conducting fruit to a receptacle without liability of injuring it.

The invention consists in the construction and novel combination and arrangement of parts, hereinafter fully described, illustrated in the accompanying drawings, and pointed out in the claim hereto appended.

In the drawings, Figure 1 is a perspective view of a fruit-gatherer constructed in accordance with this invention. Fig. 2 is a detail view of the frame or mouth.

Referring to the accompanying drawings, 1 designates the mouth or frame of a conveyer-tube 2 of a fruit-gatherer, which mouth or frame is rectangular and constructed of suitable metal and composed of four sides or blades 3, formed integral with one another and inclosing a central rectangular opening 4, adapted to receive fruit, which is readily disengaged from the stems by a slight movement of the gatherer, and by bringing a stem in an angle of the frame considerable force can be exerted without injuring the fruit, as the flat lower faces of the sides are presented to it. One corner of the frame or mouth 1 has formed integral with it or otherwise secured thereto a socket 5, in which is fitted the upper end of a handle 6, along which is secured the conveyer-tube that is constructed of suitable fabric, such as canvas or the like, and has its lower end secured to and communicating with a receiver 7. The receiver 7 breaks the fall of the fruit and prevents the same contacting with one another and causes them to gently roll into a basket or other suitable receptacle placed at the side of the receiver, and the said receiver is composed of a rectangular frame 8, vertical standards or legs secured to the inner faces of the frame at the corners thereof, and a fabric bottom 9, constructed of canvas or other suitable material and having its sides secured to the upper edges of the rectangular frame and forming a sloping bottom inclining from the back and sides of the frame toward the front thereof, and provided with an opening 10, that empties fruit into a basket or other suitable receptacle placed beneath the opening.

It will readily be seen that the fruit-gatherer is simple and comparatively inexpensive in construction, and is capable of gathering fruit and conveying the same to a convenient receptacle without injury.

The sides 3 of the mouth or frame are provided with perforations, and the upper end of the conveyer-tube is stitched or otherwise secured to the mouth or frame, and the said sides have edges sufficiently sharp to sever stems of fruit, but not so much so as to endanger the fruit.

From the foregoing description and the accompanying drawings the construction, operation, and advantages of our invention will readily be seen.

What we claim is—

A fruit-gatherer comprising the handle, the rectangular fruit-severing frame constructed of flat metal and provided with a rectangular opening or mouth, and having formed integral with it a socket arranged at one corner to receive the handle, and the conveyer-tube attached to the handle and having its upper end secured to the lower face of the frame, and thereby leaving the entire inner edges of the same free to sever fruit, said frame being adapted to receive at any of its angles and having its inner edges sufficiently sharp to readily sever the stems, substantially as described.

In testimony that we claim the foregoing as our own we have hereto affixed our signatures in presence of two witnesses.

DANIEL B. RANDALL.
                HENRY W. RANDALL.

Witnesses:
  ARTHUR W. CHENEY,
  MAUD M. CHENEY.